May 21, 1963
M. G. AMICK
3,090,457
CROP HARVESTING MACHINE
Filed April 21, 1961
3 Sheets-Sheet 1
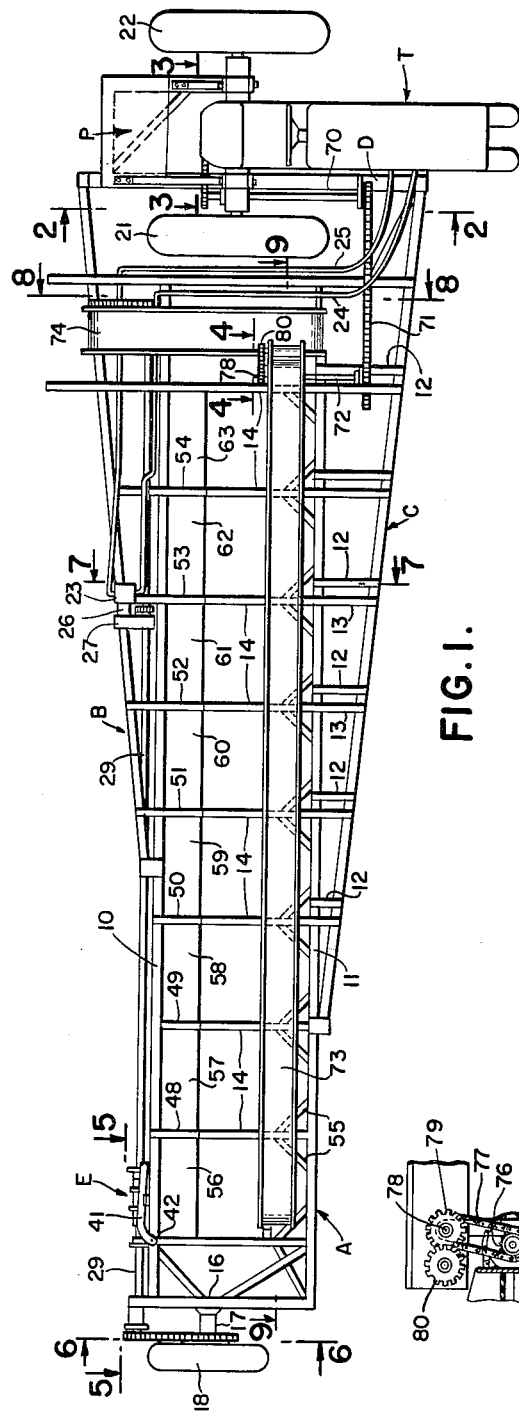
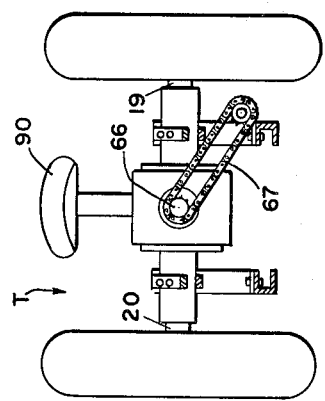
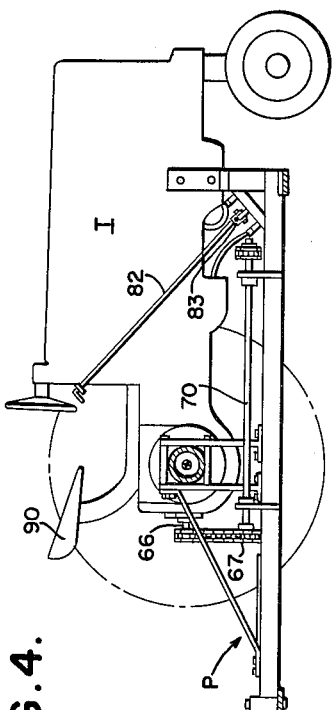
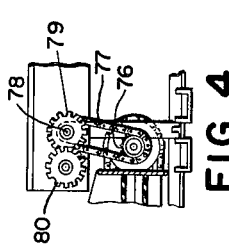
INVENTOR
Marion G. Amick
BY *Herbert M Birch*
ATTORNEY May 21, 1963

M. G. AMICK 3,090,457

CROP HARVESTING MACHINE

Filed April 21, 1961

INVENTOR
Marion G. Amick

BY *Herbert M Birch*
ATTORNEY

May 21, 1963 M. G. AMICK 3,090,457
CROP HARVESTING MACHINE
Filed April 21, 1961 3 Sheets-Sheet 3

INVENTOR
Marion G. Amick

BY *Herbert M Birch*

ATTORNEY

United States Patent Office 3,090,457
Patented May 21, 1963

3,090,457
CROP HARVESTING MACHINE
Marion G. Amick, % Red Lion Farm Inc., St. Georges Hundred, Middletown, Del.
Filed Apr. 21, 1961, Ser. No. 104,682
2 Claims. (Cl. 180—14)

The present invention relates to a harvesting machine and more particularly to a tractor mobilized harvesting machine for low growing crops.

Heretofore, for example, cucumbers used for pickling have been planted in spaced rows and at harvest time the cucumbers were hand picked by pickers slowly moving along each row with a container of some sort for receiving the cucumbers. This manual picking operation is slow and arduous and the need of a more rapid and less arduous method and means for picking such low growing crops has long been needed. Also, the pickers walking through the vines caused damage to the vines and crops.

This invention has for an object the provision of a rapid and convenient means for picking low growing crops, whereby machine and manual labor are combined to accomplish faster and better crop picking and crop loading with a minimum of vine and crop damage.

Another object is to provide a machine permitting the systematic hand picking of low growing crops, such as cucumbers, said machine including a basket supporting and loading platform and picked crop conveyor for feeding the same to the basket supporting and loading platform.

Another object is to provide an elongated frame structure for transporting rows of crop pickers over and along the respective sides of each row of crops, said frame being adjustable for height to provide for ground irregularities and the various heights of the growing crops to be picked.

A further object is to provide a laterally extending frame structure for seating and transporting a spaced row of crop pickers, whereby said pickers are arranged to be seated one on each side of a row of crops being picked, and, whereby the leading lower frame edge is so spaced with respect to the leaf growth of the growing crops that the leaves thereof are spread to thereby expose the crops and thus facilitate the location and picking of the crops normally concealed by the leafy growth.

The above and other objects and advantages of the present invention will appear more fully hereinafter from a consideration of the detailed description which follows, taken with the accompanying drawings wherein one embodiment of the invention is illustrated. It is to be expressly understood, however, that the drawings are for the purpose of illustration only and are not intended as a definition of the limits of the invention.

In the drawings, wherein like reference characters refer to like parts throughout the several views:

FIGURE 1 is a top plan view of the complete frame structure as it appears attached to a tractor for travel over a field;

FIGURE 2 is a side view partly in section of the frame and of the tractor in elevation taken on the line 2—2 of FIGURE 1;

FIGURE 3 is a view taken on the section line 3—3 of FIGURE 1;

FIGURE 4 is a view taken on the section line 4—4 of FIGURE 1;

Figure 9:
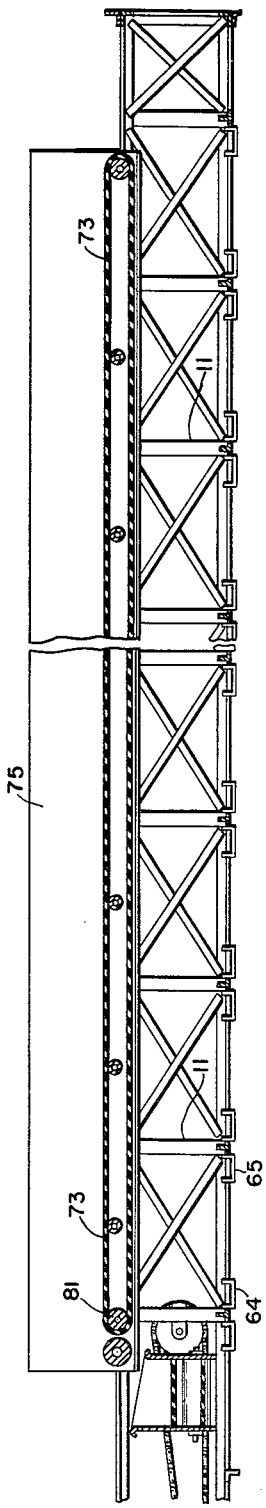
FIGURE 9 is a section taken the length of the rectangular frame with one side removed, to thereby clearly disclose the conveyor means and the mountings therefor on the same.

Referring in detail to the drawings and first with particular reference to FIGURE 1 of the drawings, there is shown an elongated rectangular frame A having each longitudinal side 10 and 11 thereof partially enveloped by prestressed wing sections or truss members B and C, respectively, secured to each side of the frame A by cross bars, such as generally indicated by the numerals 12 and lower bar extensions 13 of the cross frame bars 14. These wing sections B and C diverge outwardly from said frame sides and beyond one end thereof in the provision of means for supporting and attaching one end of the rectangular frame A to a tractor carried frame D of a tractor T Each diverged end of each wing B and C is apertured, said respective apertures being alignable with similar apertures in a T-section 91 of an adjustment bracket in each adjacent corner of the tractor frame D to receive a coupling member, such as a pin 100, see FIGURE 12.

Figure 11:
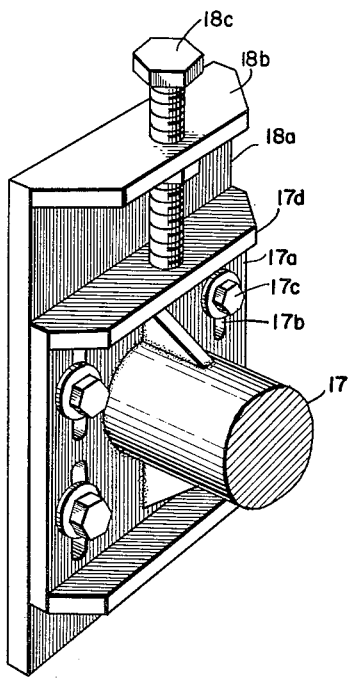
FIGURE 11 is a perspective view of an adjustable support for the outer wheel journalled at the free end of the frame structure.

At the free end of the frame A is a cross bearing bar 16 which supports a plate which carries the axle 17 of a wheel 18 journalled thereon, see FIGURE 11. The axle 17 of this wheel is in direct axial alignment with the rear wheel axles 19 and 20 of the drive wheels 21 and 22 of the tractor T. Thus with the outer wheel 18 on an axial or a center line of the tractor drive wheel axles, side slip of the wheel is prevented and castering effect is thereby eliminated as the frame A is carried forward broadside by the tractor. The wheel 18 is preferably driven by a suitable power source, such for example as a hydraulic motor 23, mounted on one of the cross bars 12 of the wing member B.

Figure 7:
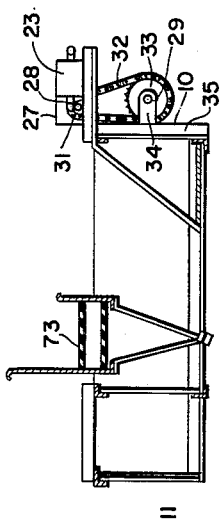
FIGURE 7 is a view taken on the section line 7—7 of FIGURE 1.

The hydraulic or fluid motor 23 is connected by conduits 24 and 25 from the usual fluid pump, not shown, of the tractor T and the output connection 26 of the motor 23 leads to a gear train in gear box 27. This gear train drives a shaft 28, see FIGURE 7. On the shaft 28 is keyed a sprocket wheel 31. A drive chain 32 is reeved around the sprocket 31 and a second relatively larger lower positioned sprocket 33, said second sprocket being keyed to an elongated drive shaft 29 supported for rotation in longitudinally spaced lugs, such as the lug 34 secured to extend laterally from an upstanding side frame bar 35 of the side frame 10, see FIGURES 5 and 7.

Figure 5:
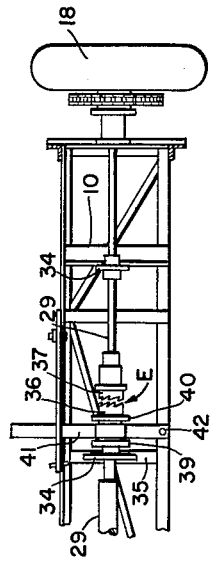
FIGURE 5 is a view taken on the section line 5—5 of FIGURE 1.
Figure 6:
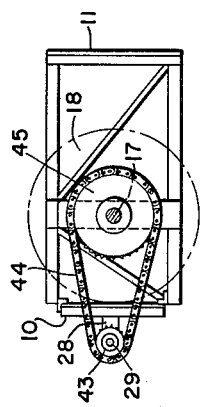
FIGURE 6 is a view taken on the section line 6—6 of FIGURE 1.

The drive shaft 29 for the wheel 18 is broken at an intermediate section by a clutch E having interengaging toothed sections 36 and 37 as detailed in FIGURE 5 of the drawings. The toothed clutch section 36 is reciprocable to and from engagement with clutch section 37 and includes spaced shift disks 39 and 40 with a pivotally mounted yoke or shift lever 41. For example, the shift lever 41 is pivoted on a pin 42 on the side frame 10. The end of the shaft 29 terminates beyond the end of the frame structure and has keyed thereto a sprocket wheel 43, see FIGURES 5 and 6. This sprocket wheel 43 drives a sprocket chain 44 reeved around a relatively larger driven sprocket 45 keyed on the axle 17 of the wheel 18. Thus the wheel 18 may be clutched and declutched as driving or non-driving action of the wheel is required.

Referring in detail to FIGURE 11, the axle 17 of the wheel 18 is preferably secured to an adjustable support which comprises a slotted plate 17a, having elongated bolt receiving slots 17b. Bolts 17c thread into the threaded bores not shown, formed in a mounting plate 18a secured as by welding to cross bar 16 at the end of the frame A.

Each plate 17a and 18a is formed with a flange 17d and 18b, respectively, and flange 18b is formed with a threaded bore for receiving a jack bolt 18c. The jack bolt serves to raise or lower the axle 17 as desired to correspond to the adjustment of the frame at the tractor or it may be adjusted according to the condition of the ground over which the wheel 18 is to travel.

Figure 12:
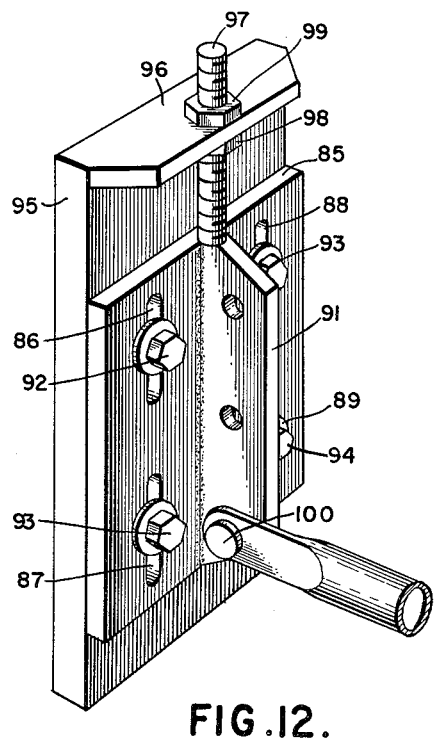
FIGURE 12 is a perspective view of an adjustable support at each side of the tractor for adjustably mounting the frame at each side to the tractor frame.

In reference to the frame adjustment bracket secured to the side frame D of the tractor, there is shown in FIGURE 12 an adjustment plate 85 formed with two rows of slots 86—87 and 88—89 on each side of a T-section 91 formed from the plate centrally thereof.

Bolts 92—93 and 93—94 extend through the slots and thread into threader bores formed in a backing or support plate 95. This plate 95 is formed at the top with a flange 96 and is centrally formed with a threaded bore for a jack bolt 97. The free end of the jack bolt is engageable with the top end edge of the T-section 91 and thereby serves to regulate the raising or lowering of the frame ends of the wing sections B and C of FIGURE 1. The bolt may be locked at its adjusted position by nuts 98—99.

The T-section 91 is formed with a vertical row of openings and the bars of the wing sections may be selectively and pivotally secured to the T-section by a pivot pin 100 as desired. This arrangement provides for additional lift, if it is desired.

During fabrication of the frame unit A the same is prestressed in a suitable manner to provide greater frame rigidity and stability to the extended free end or outer end thereof, thereby permitting the single wheel 18 to support the same efficiently without castering or hunting action during use. The frame A, see FIGURES 1 and 9, has spaced apart slanting bars 48, 49, 50, 51, 52, 53 and 54 extending from the upper portion of the frame unit side structure 10 to an intermediate portion of each bottom frame cross bar 14. The bars 14 at each end have angular brace members 55 to provide frame reinforcement at the bottom of side frame 11 and also at the bottom of side frame 10, to serve as support means for a plurality of aligned seats 56, 57, 58, 59, 60, 61, 62 and 63, see FIGURES 1 and 9. Thus, for example, there may be, if desired, eight seats provided along the overall frame length adjacent side 10 for seating eight workers and arranged in spaced apart relation opposite each seat are pairs of foot rests 64 and 65 for each worker's feet.

The open seating spaces of the rectangular frame unit A are preferably thirty inches (30") wide, such width depending upon the spacing of the planted rows of growing crops as will be hereinafter discussed.

The tractor T to which the assembled frame unit is attached should have a transmission system adaptable for ground speed of less than one mile per hour, and as a result of actual practice, it has been discovered that for efficiently picking cucumbers from plus one inch to minus two inches in diameter, a ground speed of up to seven-tenths (.7) to eight-tenths (.8) miles per hour is attainable.

Figure 8:
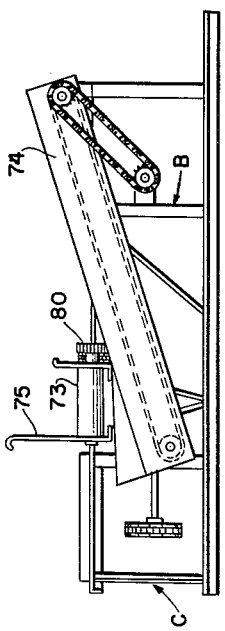
FIGURE 8 is a view taken on the section line 8—8 of FIGURE 1.

The tractor T has the usual power take-off connections, see FIGURES 1, 2 and 3. For example, a take-off shaft 66 with chain and sprocket drive 67 to a second shaft 70 with a second chain and sprocket drive arrangement 71 to a third shaft 72 is provided as a drive for an endless conveyor belt 73. The belt 73 is elevated and extends longitudinally and adjacent the upper edge of the front side frame 11 of the frame unit A, so the workers as they pick the crops, pickle size cucumbers for example, may place the same on the conveyor belt 73 for conveyance to a second endless conveyor 74. An upstanding baffle or wall 75 is arranged at right angles to the path of travel of the first conveyor 73, see FIGURES 1 and 8. The picked crops are conveyed by the second belt 74 to a suitable platform P on the tractor frame D and loaded into baskets, not shown, on the platform.

Now with reference to FIGURES 1 and 4, the third shaft 72 from the tractor power take-off and respective chain drives 67 and 71, has keyed to an end thereof a sprocket 76 which drives a sprocket chain 77 on a small sprocket on a stub shaft 78 secured to the frame unit, which stub shaft 78 also rotatably supports a spur gear 79. The gear 79 meshes with a spur gear 80 which is adapted to drive a roller 81 of the endless conveyor belt 73, see the sectioned portion of FIGURE 9.

As shown in FIGURE 2, power from the tractor hydraulic system is obtained by operating by-pass valve 82 and energizing fluid line connection 83. The belt conveyors 73 and 74 are continuously driven mechanically from the power take-off shaft on the tractor.

Operation of Unit

The tractor T to which frame unit A is attached as stated preferably has a transmission system adaptable for ground speed of less than one mile per hour. Experience shows that for picking cucumbers from plus one inch to minus two inches in diameter a ground speed of up to .7 or .8 mile per hour is attainable. This is much faster than heretofore possible without the machine by manual labor.

With the machine in the field, four rows on five foot spacings may be covered and as shown seats for eight men are on the machine. Each worker is in a sitting position and each man picks one-half of a row, for example, No. 1 man on the seat 56 of the frame picks the left side of No. 1 row of growing crops; No. 2 man on seat 57 picks the right side of No. 1 row and so on across the machine. It has been found that the machine frame should preferably be elevated nine and eleven inches off the ground, so that each man can comfortably and conveniently pick a thirty inch width, that is, one-half a row.

The height of the machine is adjusted so the lower front longitudinal rail of frame A drags the top of plant leaves to a depth of about two inches. Means are provided in the tractor frame D for such adjustment of the frame A. This has been adequate to open up the plant foliage, so that the pickers can readily spot the fruit or crop and greatly facilitate the speed of picking and it further reduces missed and consequently resulting oversize fruit on a subsequent picking operation.

The tractor provides oil under adequate pressure and quantity to operate the hydraulic power unit 23 at its required normal output in speed and torque plus an excess to allow variable control. This variable control is accomplished by the bypass valve connection 83, conveniently controlled by the tractor operator.

Baskets may be carried on the platform P in back of the tractor seat 90, see FIGURE 2, and a man walks behind the machine and feeds empty baskets under conveyor discharge end and removes the loaded baskets in rows behind the tractor, to be picked up by another vehicle after the machine has cleared the roadway.

In using this machine, a field should be planted to a pattern corresponding to the number of open picking positions on the frame A and to allow adequate areas for tractor passage and outer wheel space with adequate additional space for vine growth. For example, for a four row machine the planting is begun from one side of the field, so as to leave fifteen feet to the first row. Then plant four rows on five foot spacings, omit one five foot row, thereby providing an open space of ten feet, then plant four five foot rows, and leave out or omit two five foot rows, thereby providing an open space of fifteen feet and again plant four rows with a five foot spacing and continue to repeat this pattern of planting across the field.

Thus with the spacing of the open sections of the frame for the workers and their respective seating stations and the allowance for the tractor T and the end wheel 18, the frame unit A as it travels over the predetermined planted row pattern permits superior picking efficiency without plant or crop damage.

Thus there is provided a machine consisting of an internal rectangular frame, partially enveloped and supported by two wing sections. These wings provide means of supporting and attaching one end of the rectangular frame unit to a suitable frame mounted on a tractor and by prestressing the rectangular frame during assembly, stability is provided to the outer end, thus allowing its support to be provided by a single ground wheel. Enclosed in this frame are spaced open working spaces preferably thirty inches wide, with seats for a plurality of workers, eight workers for example. Conventional endless conveyors are provided to carry the gathered crops away from the workers out of the planted area and into the usual containers for handling the crops, such for example as cucumbers.

Also with the present invention, the outer wheel is provided so as to have novel flexibility, that is, control over speed, torque, and ability to be clutched in or out of operation with provisions for in gear backing up and over drive clutch to prevent damage to machine drive elements.

Figure 10:
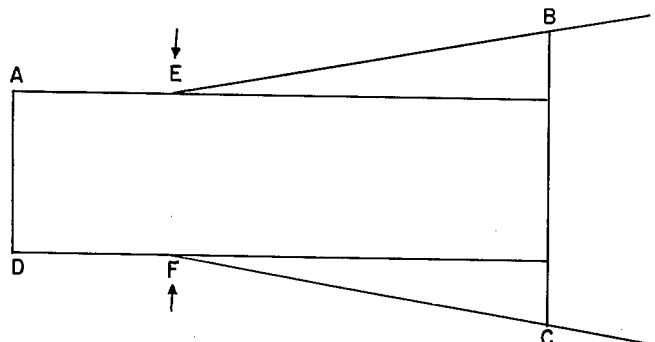
FIGURE 10 is a diagrammatic illustration of the prestressed frame construction.

In reference to FIGURE 10 of the drawings there is shown a diagrammatic plan view of the complete rectangular frame structure and its associated wing portions, to thereby illustrate the method or practice of prestressing the frame during fabrication thereof. For example, the rectangular frame is placed on leveling blocks with transverse or cross supporting member BC welded in place. After all cross members and internal bracing is installed and welded, corner A of the frame is raised approximately two inches and blocked, thus putting a twist at cross member section A–D. Then wing section EB is welded in place with its bracing. Corner A is now dropped back to level position and corner D is raised approximately two inches and wing section FC and its bracings are welded in place. This creates inward forces at E and F as indicated by the arrows and along the braced portions of the wing sections tending to crush the structure, to thereby prestress the same.

Although the present invention is described in detail for only one embodiment thereof, it is to be expressly understood that the invention is not limited thereto, as various changes may be made in the design and arrangement of the parts without departing from the spirit and scope of the invention, as will now likely occur to others skilled in the art. For a definition of the scope of the invention, reference should be had to the appended claims.

What is claimed is:

1. A crop picking frame unit comprising a rectangular prestressed bottom portion, vertical side frame portions and supporting wing members one of each being secured to each of said side frames, a tractor with a frame having means for supporting said respective wing ends at various levels with respect to the side of the tractor, an end wheel journalled at an end of said frame unit, drive means for said wheel, and said rectangular bottom portion of the frame unit being formed with open spaces including worker supporting seats and foot rests, said seats being arranged in predetermined positions for picking rows of low growing crops planted on a row for row pattern conforming to said frame unit spaces and worker seats, frame supporting end wheel, and tractor width, said means for supporting said respective wing ends comprising a vertically movable plate with a T-section having vertical pin openings therein for pivotally securing a respective wing end thereto.

2. A crop picking frame unit comprising a rectangular prestressed bottom portion, vertical side frame portions and supporting wing members one of each being secured to each of said side frames, a tractor with a frame having means for supporting said respective wing ends at various levels with respect to the side of the tractor, an end wheel journalled at an end of said frame unit, drive means for said wheel, and said rectangular bottom portion of the frame unit being formed with open spaces including worker supporting seats and foot rests, said seats being arranged in predetermined positions for picking rows of low growing crops planted on a row for row pattern conforming to said frame unit spaces and worker seats, frame supporting end wheel, and tractor width, said means for supporting said respective wing ends comprising a vertically movable plate with a T-section having vertical pin openings therein for pivotally securing a respective wing end thereto, said end wheel axle being supported by a vertically movable plate, and including a jack means for raising and lowering the same.

References Cited in the file of this patent

UNITED STATES PATENTS

| | | |
|---|---|---|
| 2,524,181 | Sivertson | Oct. 3, 1950 |
| 2,575,466 | Paul | Nov. 20, 1951 |
| 2,704,158 | Long | Mar. 15, 1955 |
| 2,861,703 | Imazimi et al. | Nov. 25, 1958 |
| 2,879,857 | Kreiss | Mar. 31, 1959 |